Feb. 23, 1960

R. S. WEAVER 2,926,034

SPLINE COUPLING

Filed April 4, 1956

United States Patent Office 2,926,034
Patented Feb. 23, 1960

2,926,034

SPLINE COUPLING

Reuben S. Weaver, Stevens, Pa.

Application April 4, 1956, Serial No. 575,983

1 Claim. (Cl. 287—53)

This invention relates to a spline joint and more particularly to a spline joint for power take-off equipment in which the component parts can be urged into engagement with one another automatically.

The conventional spline coupling for power take-off equipment comprises two parts; a spline shaft provided on the prime mover or driving mechanism, and a spline hub on the device to be driven. In the conventional spline shaft and spline hub, the splines have square ends and it is necessary to manually direct the spline shaft into the spline hub so that the splines and grooves will be properly aligned. Also, in the conventional spline coupling, the shaft and hub are held in firm engagement with one another by means of a pin passing through the spline hub which pin fits into a recess in one of the splines of the spline shaft, thereby preventing the spline shaft from becoming disengaged from the spline hub after the coupling has been secured together. While the spline shaft is being urged into driving relationship with the spline receptacle, the pin must be manually operated to allow the spline shaft to enter the receptacle a sufficient distance to insure proper drivng contact before the pin raises into the recess in the spline. It will be understood that while all of the splines are provided with this recess, the pin will engage only one recess at any one given time.

It is an object of this invention to provide a spline coupling in which the splines on the spline shaft will automatically align themselves with the grooves in the spline hub and one of the splines on the spline shaft will automatically operate the retaining pin so that manual manipulation thereof is not necessary.

Figure 1:
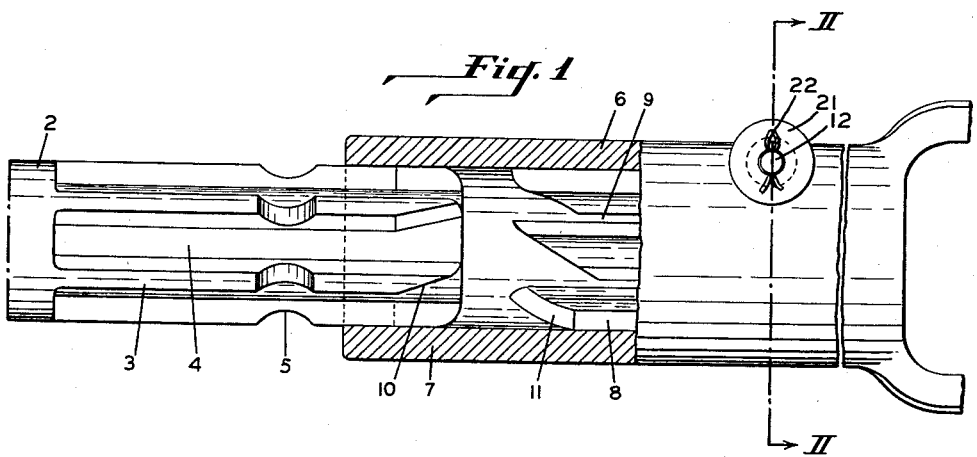
Figure 2:
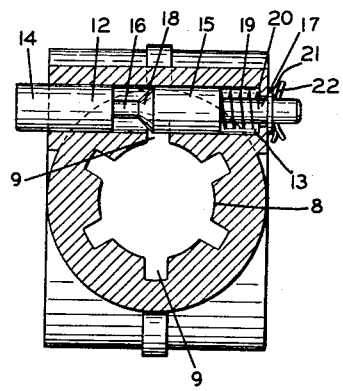

In order that my invention may be more readily understood, it will be described in connection with the attached drawing in which Figure 1 is an elevational view of the spline coupling just prior to engagement of the spline shaft with the spline hub; and Figure 2 is a cross-sectional view taken on the line II—II of Figure 1.

Referring to Figure 1, there is shown a spline shaft 2 provided with a plurality of splines 3 with grooves 4 located therebetween. Each of the splines 3 is provided with a pin engaging recess 5. In the conventional equipment, the spline shaft 2 is on the device supplying the power and the spline hub 6 is on the piece of equipment to be driven. The hub 6 is provided with an elongated housing 7 for the reception of the spline shaft 2. The internal diameter of the housing 7 is slightly more than the exterior diameter of the spline shaft 2. Positioned on the inner-circumference of the hub 6 are a plurality of splines 8 with grooves 9 located therebetween. The splines 8 on the hub 6 are of the same cross-sectional dimensions as the grooves 4 on the spline shaft 2 and the grooves 9 in the hub are of the same cross-sectional dimensions as the splines 3 on the shaft.

In order to direct the splines 3 into the grooves 9 the splines 3 are bevelled from a point at one side of the leading end of the spline to a point along the other side of the spline. The splines 8 are bevelled from a point at the opposite side of the leading end to a point on the other side so that as the spline shaft and spline hub are brought into axial alignment and urged into engagement with one another the bevelled surfaces on the splines on the shaft engage the bevelled surfaces of the splines on the hub and the resulting cam action from continued urging of the two units together rotate the two with respect to one another to align the splines of one with the grooves of the other. With this arrangement, when the shaft 2 is urged into the hub 6, if the splines 3 engage the splines 8, such engagement occurs in the area of the bevels 10 and 11. These bevels serve as cams as the two are urged toward one another and rotate the members so the splines 3 are aligned with the grooves 9 and the spines 8 are aligned with the grooves 4. The housing 7 is of sufficient length to receive the spline shaft 2 and properly align the spline shaft and the spline hub so they are on the same longitudinal axis before the splines 3 and 8 engage one another on their beveled ends 10 and 11.

Referring now to Figure 2, the position of the pin 12 is shown with respect to the other parts of the coupling. This view shows the spline hub without the spline shaft positioned therein. The pin 12 shown in a well 13 is in its fully extended position which it assumes either when the spline shaft 2 is not in position or when the spline shaft is in its fully engaged position and the pin 12 is positioned in the recess 5. The pin 12 has two enlarged portions 14 and 15 and two restricted portions 16 and 17. The area 16 is of sufficient length to extend across one of the groves 9 in the spline hub so that one of the splines 3 may pass through the notch in the pin provided by the restricted area 16. The shoulder of the enlarged portion 15 adjacent the restricted portion 16 is beveled from the edge of the enlarged portion 15 to the restricted portion 16 as shown at 18. The pin is held in its fully extended position as shown in the drawing by means of the spring 19 which surrounds the restricted portion 17 of the pin and is compressed between the bottom surface of the enlarged portion 15 and the bottom 20 of the pin well 13. On the outside of the pin well 13, the pin is provided with a washer 21 and a cotter pin 22.

As the spline shaft 2 is moving into the spline hub 7 with the splines 3 passing through the grooves 9 and splines 8 passing through the grooves 4, the leading edge of the bevel 10 which is riding in the groove 9 through which the pin 12 extends, engages the bevel 18 on the pin. Continued forward movement of the spline in the groove forces the pin in a downward direction until the restricted area 16 is in alignment with the groove 9. This permits the spline to pass through the groove until the recess 5 is in alignment with the pin. When this occurs, the surface of the spline will no longer depress the pin against the compression of spring 19 and the spring will urge the pin in the opposite direction bringing the enlarged portion 15 into position in the pin receiving recess 5 of the spline 3. Upward movement of the pin 12 is restricted by the washer 21 and cotter pin 22. When it is necessary to uncouple the device, the pin is forced downward manually against the compression of spring 19 again bringing the restricted area 15 in alignment with the groove 9 permitting the spline to pass the pin whereby the spline shaft can be moved freely from the spline hub.

The bevels 10 and 11 on the respective splines should be of a degree sufficient to permit the proper caming action to turn the component parts with respect with one another but at the same time the degree of angularity should not be so great as to dangerously diminish the area provided for engagement of the complementary respective splines. In the embodiment here under consideration, the angle is approximately forty-five degrees.

In the operation of the device here under consideration, the clutch on the driving member is disengaged so that the spline shaft 2 is not rotating. The two devices are moved toward one another and the spline shaft 2 is guided into the housing 7 until the bevels of the splines 3 on the spline shaft engage the bevels on the splines 11 in the hub. The cam surfaces provided by the bevels 10 and 11 will rotate the members with respect to one another until the splines 3 are aligned with the grooves 9 and the splines 8 are aligned with the grooves 4. Continued movement of the splines in the grooves causes one of the bevels 10 moving through one of the grooves 9 to engage the cam surface 18 on the enlarged portion 15 moving the pin in a direction from left to right as shown in Figure 2 bringing restricted portion 16 into alignment with groove 9. Continued movement of the members toward one another permits the spline 3 to pass through the groove 9 beyond the pin 14 until the recess 5 is in alignment with the enlarged portion 15 at which time spring 19 forces the pin from right to left as shown in Figure 2 bringing the enlarged area 15 in the recess 5 and locking the spline shaft in position in the spline hub. Engagement of the clutch on the driving mechanism rotates the shaft 2 and through the spline connection will impart rotary motion to the spline hub 6 which can be connected to any mechanism to which power is to be applied.

It will be obvious from the foregoing that I have developed a spline joint wihch will automatically align itself and will automatically depress the spline coupling retention pin making it unnecessary to manually turn the component parts and manually depress the pin during the coupling operation. With this improvement, the coupling of a prime mover to a device to be driven can be easily accomplished by one operator while manipulating the prime mover into position with respect to the article to be driven.

I claim:

In a spline joint, the elements comprising a spline shaft provided with a plurality of splines arranged therearound parallel to the axis of the spline shaft, a spline hub having complementary splines to fit in the grooves between the splines on the spline shaft and having grooves between the splines in the hub to receive the splines of the spline shaft, the splines on the spline shaft being beveled from a point at one side of the leading end to a point along the other side of the spline and the splines on the hub being beveled from the opposite side of the leading end to a point on the other side so that the bevels cooperate to turn the spline shaft and the hub with respect to one another, a coupling retention pin in the spline hub to engage one of the splines of the spline shaft when it is in position in the hub, and a beveled area on the shank of said pin for engagement with the beveled area of one of the splines on the spline shaft to move the pin in a direction normal to the direction of movement of the spline shaft into the spline hub.

References Cited in the file of this patent

UNITED STATES PATENTS

| | | |
|---|---|---|
| 1,381,805 | Crewdson | June 14, 1921 |
| 1,541,007 | Thiemer | June 9, 1925 |
| 2,448,278 | Ronning | Aug. 31, 1948 |
| 2,626,821 | Bouget et al. | Jan. 27, 1953 |
| 2,735,281 | Hubert et al. | Feb. 21, 1956 |